United States Patent
Kielwein et al.

[11] Patent Number: 5,904,311
[45] Date of Patent: May 18, 1999

[54] CONTROL DISK FOR A BELT RETRACTOR

[75] Inventors: Thomas Kielwein, Eschach; Andreas Hermanni, Alfdorf, both of Germany

[73] Assignee: TRW Occupant Restraint Systems GmbH, Alfdorf, Germany

[21] Appl. No.: 08/962,707

[22] Filed: Nov. 3, 1997

[30] Foreign Application Priority Data

Nov. 4, 1996 [DE] Germany ............ 296 19 109

[51] Int. Cl.⁶ .................................. B60R 22/405
[52] U.S. Cl. ........................................ 242/383.2
[58] Field of Search ............... 242/383.2, 383.3, 242/383.4, 383.5, 384, 384.1, 384.2, 384.3, 384.4, 384.5, 384.6; 297/478; 280/806

[56] References Cited

U.S. PATENT DOCUMENTS

| | | | |
|---|---|---|---|
| 4,258,887 | 3/1981 | Fohl et al. | 242/383.2 |
| 4,509,706 | 4/1985 | Thomas | 242/384.5 |
| 4,597,544 | 7/1986 | Fohl | 242/384.6 |
| 4,632,331 | 12/1986 | Bracnik et al. | 242/384.5 |
| 4,687,156 | 8/1987 | Mori | 242/384.6 |
| 4,767,078 | 8/1988 | Fohl | 242/383.2 |
| 5,042,738 | 8/1991 | Mori . | |

FOREIGN PATENT DOCUMENTS

| | | |
|---|---|---|
| 3338187 | 5/1985 | Germany . |
| 4001240 | 7/1990 | Germany . |

*Primary Examiner*—John M. Jillions
*Attorney, Agent, or Firm*—Tarolli, Sundheim, Covell, Tummino & Szabo

[57] ABSTRACT

A control disk for a belt retractor comprises an inertial disk and an actuating projection. The inertial disk is rotatable relative to the control disk and connected. thereto by a slipping clutch.

6 Claims, 3 Drawing Sheets

CONTROL DISK FOR A BELT RETRACTOR

The invention relates to a control disk for a belt retractor.

BACKGROUND OF THE INVENTION

A conventional control disk for a belt retractor comprises an inertial disk and an actuating projection. A control disk of this type is part of a latching mechanism with which the belt reel of the belt retractor, on which the belt webbing is coiled, can be blocked by vehicle-sensitive or belt webbing-sensitive means against rotation in the uncoiling direction. The latching mechanism of such a belt retractor is known, this being the reason why it is only briefly mentioned in the following.

The control disk of the latching mechanism can be rotated relatively to the belt reel to a limited extent. When the latching mechanism is activated in a vehicle-sensitive manner, i.e. by exceeding a predetermined acceleration or deceleration of the vehicle, or in a belt webbing sensitive manner, i.e. by exceeding a predetermined rotational acceleration of the belt reel due to tensile forces acting in the belt webbing, a rotation of the disk relatively to the belt reel occurs, as a result of which the actuating projection is swiveled into an activating position so that the belt reel is coupled non-rotatably to a control lever or a similar functional part which on rotation of the belt reel in the uncoiling direction activates a load-bearing blocking pawl and thus causes blocking of the belt reel. The belt reel is then blocked in the uncoiling direction.

More recently, belt-tensioning means are finding increasing use by which, after actuation, the so-called belt slack of the seat belt system is eliminated so that the vehicle occupant is involved as early as possible in a deceleration of the vehicle. In particular, buckle tensioners are known, which displace the belt buckle such that the seat belt is tensioned, and retractor tensioners which rotate the belt reel in the coiling direction so that excess belt webbing is taken up. In both systems, high acceleration of the belt reel and the functional parts connected thereto materializes, i.e. in the case of a buckle tensioner in the uncoiling direction of the belt webbing and in the case of a retractor tensioner in the coiling direction of the belt webbing. These high accelerations might result in damage to the functional parts of the latching mechanism so that following a tensioning action proper functioning of the belt retractor would no longer be assured. This is why it may be provided for that certain parts of the belt retractor are decoupled from the belt reel as soon as an excessively high rotational acceleration of the belt reel occurs; it being known, for example, to provide the control disk with a front face toothing which cooperates with an assigned gear toothing on the belt reel, the control disk being elastically loaded in the direction of the belt reel. In this way a slipping clutch is achieved by means of which the control disk can be decoupled from the belt reel as soon as a predetermined rotational acceleration of the latter occurs.

BRIEF DESCRIPTION OF THE INVENTION

Contrary to this configuration, the invention provides a control disk in which merely the inertial disk can be decoupled from the control disk when a predetermined rotational acceleration is exceeded. The invention is based namely on the knowledge that for sufficient protection of the latching mechanism of a belt retractor from damage in the presence of high rotational accelerations, it is merely necessary to decouple from the control disk the inertial disk which represents the majority of the mass inertia of the latching mechanism with respect to rotational accelerations. According to the invention, a control disk for a belt retractor comprises an inertial disk and an actuating projection. The inertial disk is rotatable relative to the control disk and connected thereto by a slipping clutch. Since the slipping clutch in normal operation is merely required to handle the forces needed to drive the inertial disk, the slipping clutch may be dimensioned relatively small, resulting in weight and cost advantages in production. The slipping clutch is effective in both directions, i.e. permits a relative rotation between the inertial disk and the control disk in both directions.

In accordance with a preferred embodiment of the invention, it is provided for that the slipping clutch engages the inertial disk in the radial direction. In this configuration, a latching mechanism of the belt retractor is achieved which is particularly compact in the axial direction.

In accordance with the preferred embodiment, the inertial disk is provided with a central opening, the edge of which comprises a plurality of radial recesses, and the control disk is provided with several flexible latching noses which pass through the central opening and engage the edge thereof. In this configuration, the torque at which the slipping clutch permits a relative rotation between control disk and inertial disk can be defined in a particularly simple manner by selecting the effective radius of the slipping clutch correspondingly, i.e. by selecting the radius of the central opening of the inertial disk.

BRIEF DESCRIPTION OF THE DRAWINGS

The invention will now be explained on the basis of a preferred embodiment as represented in the attached drawings in which.

DETAILED DESCRIPTION OF THE INVENTION

Figure 1:
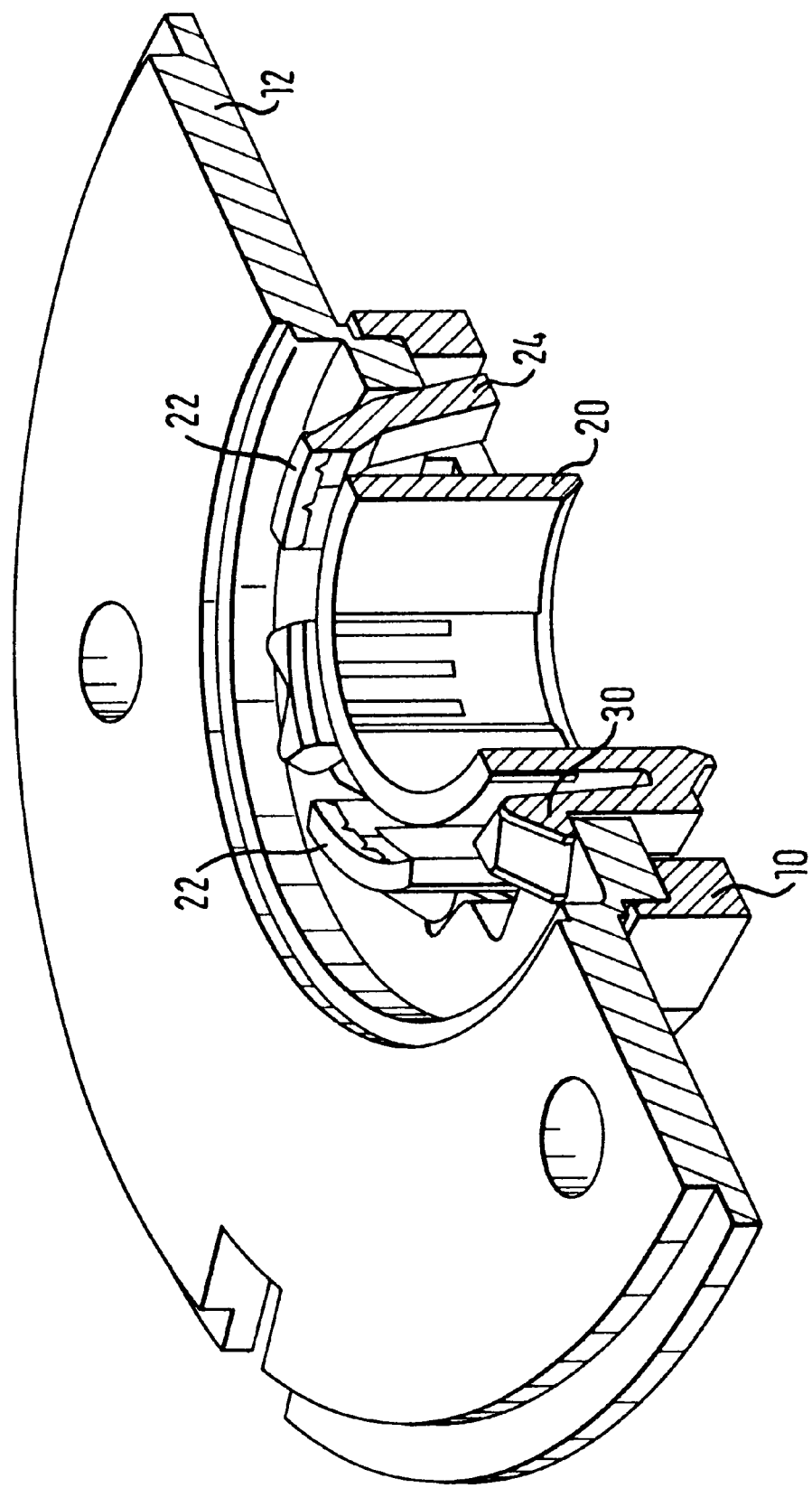
FIG. 1 is a perspective, partially sectioned view of a control disk in accordance with the invention with its inertial disk.
Figure 2:
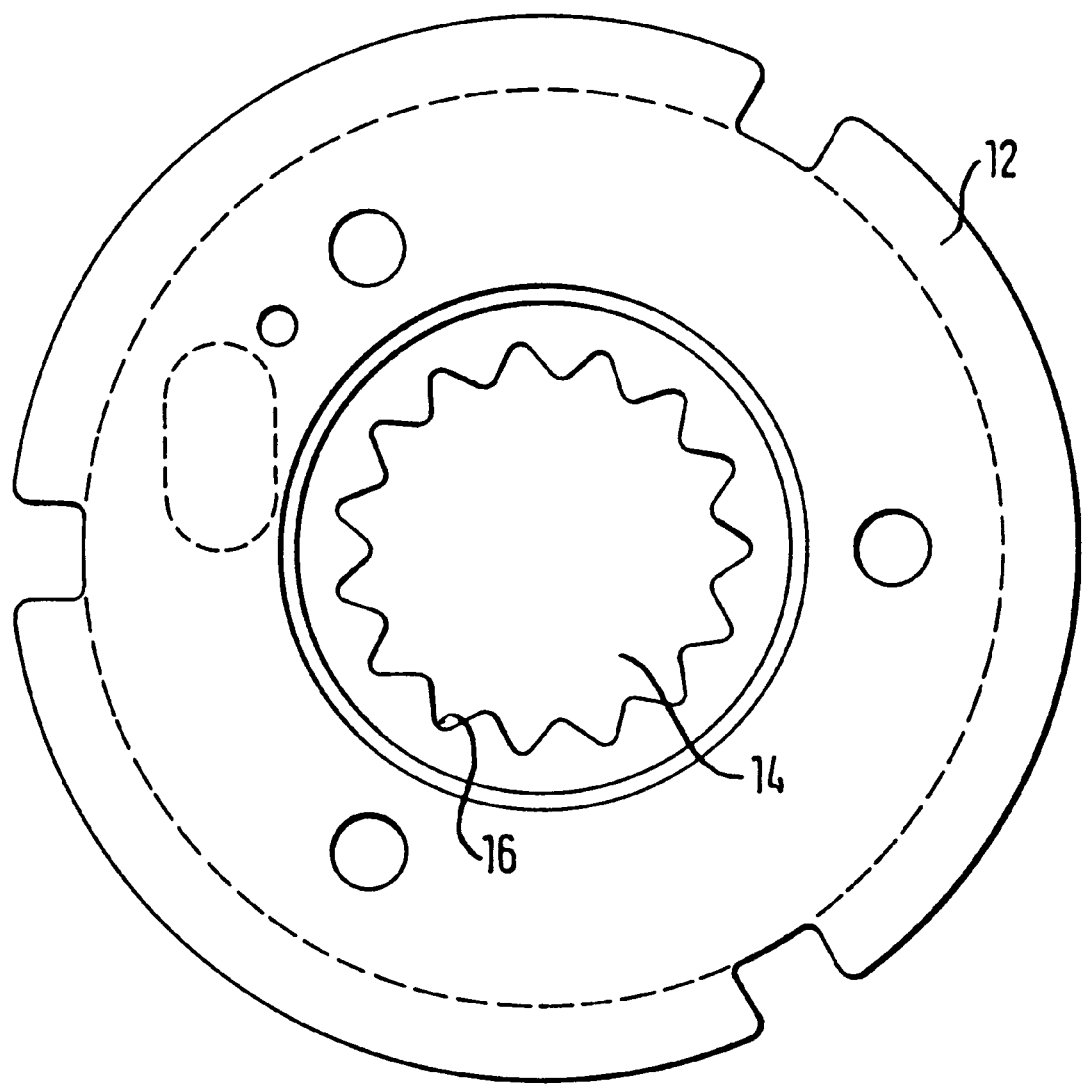
FIG. 2 is a plan view of the inertial disk of FIG. 1.

FIG. 1 shows in a perspective partially sectioned view a control disk 10 in accordance with the invention for a belt retractor, the control disk being provided with an inertial disk 12. This inertial disk 12 is made of metal and is provided with a central opening 14, at the edge of which a plurality of V-shaped recesses 16 is formed.

Figure 3:
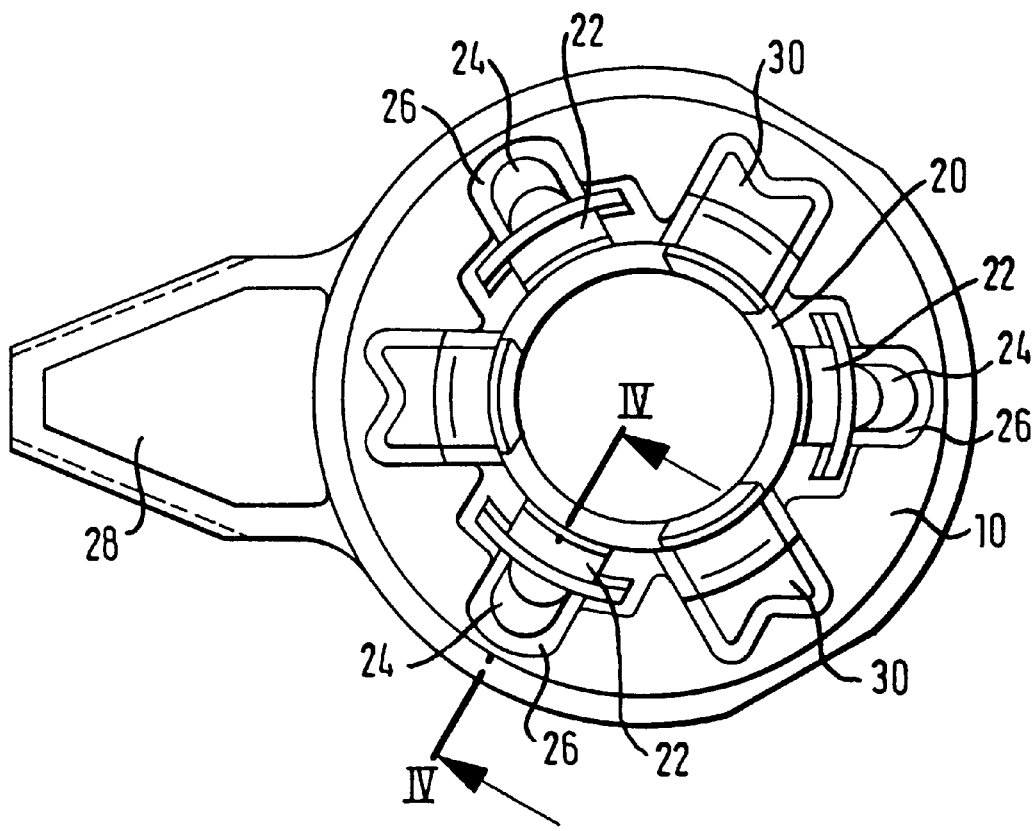
FIG. 3 is a plan view of the control disk of FIG. 1.
Figure 4:
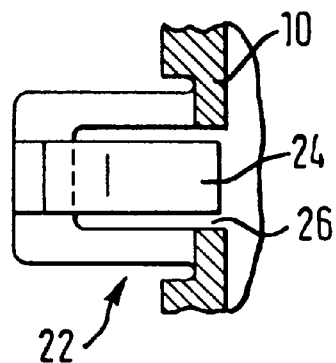
FIG. 4 is a detail of the control disk of FIG. 3.

The control disk 10 (see also FIG. 3) is provided with a mounting sleeve 20 for its attachment. Three latching noses 22 (see also FIG. 4) are mounted equispaced about this mounting sleeve 20. Each latching nose 22 protrudes from the control disk 10 in the axial direction. At the free end of each latching nose 22, a latching strap 24 is provided which also extends axially towards the control disk 10. This latching strap 24 protrudes into an opening 26 which is configured at the same radius as the corresponding latching nose 22 in the control disk. As viewed in the circumferential direction of the control disk 10, this opening 26 is wider than the corresponding latching strap 24, the dimensions relative to each other being so selected that when the latching strap 24 is deformed in the circumferential direction of the disk 10, the latching strap abuts the wall of the opening before the latching strap 24 or the latching nose 22 become plastically deformed. Accordingly, only elastic deformation is involved.

The control disk 10 is also provided with an actuating projection 28 as well as three retaining straps 30. These retaining straps also extend in the axial direction and are arranged equispaced between the latching noses 22.

As is particularly evident in FIG. 1, the inertial disk 12 is arranged on the control disk 10 in such a way that the latching noses 22 and the retaining straps 30 pass through the central opening 14 of the inertial disk 12 in the axial direction, the retaining straps 30 holding the inertial disk 12 at the control disk 10 in the axial direction. The latching noses 22 and, more particularly, the latching straps 24 each engage in one of the V-shaped recesses 16.

The dimensions of the central opening 14 and the recesses 16 as well as those of the latching noses 22 and the latching straps 24 are so selected that the latching straps 24 cooperate with the recesses 16 like a slipping clutch which, when a predetermined torque effective between the control disk 10 and the inertial disk 12 is exceeded, permits a rotation of the one relative to the other. In such a relative rotation the latching noses 22 together with the latching straps 24 are deformed radially inwards, a contact between the latching straps 24 and the wall of the corresponding opening 26 being able to occur thereby.

In this configuration of the control disk 10 and inertial disk 12, the inertial disk is decoupled from the control disk when high rotational accelerations act on the control disk 10. The slipping clutch used for decoupling is particularly compact, whilst at the same time a nominal torque, as of which a rotation of the control disk relative to the inertial disk materializes, is achieved which can be reproduced very accurately.

We claim:

1. A control disk assembly for a belt retractor, said control disk assembly comprising:

a control disk; and an inertial disk having an actuating projection, said inertial disk being rotatable relative to said control disk and connected thereto by a slipping clutch, said inertial disk being provided with a central opening having an edge which comprises a plurality of radial recesses, said control disk including a plurality of flexible latching noses which pass through said central opening and engage said edge of said central opening, each of said plurality of latching noses protruding axially from said control disk and being provided with an axially extending latching strap which is connected to a respective one of said plurality of latching noses by a free end thereof, each of said latching straps extending axially toward said control disk.

2. The control disk assembly of claim 1 wherein said slipping clutch engages said inertial disk in a radial direction with respect to a central axis of said inertial disk.

3. The control disk assembly of claim 1 wherein said control further includes a plurality of openings, each of said plurality of openings being assigned to a respective one of said plurality of latching noses and being located on a radius which is the same as that of the assigned one of said plurality of latching noses, each of said latching straps extending into a corresponding one of said plurality of openings.

4. The control disk assembly of claim 1 wherein said inertial disk is made of metal and said control disk is made of a plastic material.

5. The control disk assembly of claim 1 wherein each of said plurality of radial recesses is V-shaped.

6. A control disk assembly for a belt retractor, said control disk assembly comprising:

a control disk; and an inertial disk having an actuating projection, said inertial disk being rotatable relative to said control disk and connected thereto by a slipping clutch, said inertial disk being provided with a central opening having an edge which comprises a plurality of radial recesses, said control disk including a plurality of flexible latching noses which pass through said central opening and engage said edge, each of said plurality of latching noses protruding axially from said control disk and being provided with an axially extending latching strap which is connected to a respective one of said plurality of latching noses by a free end thereof;

said control further including a plurality of openings, each of said plurality of openings being assigned to a respective one of said plurality of latching noses and being located on a radius which is the same as that of the assigned one of said plurality of latching noses, each of said latching straps extending into a corresponding one of said plurality of openings, said latching straps and said plurality of openings being dimensioned so that each of said latching straps is able to elastically deform until abutting a surface of a respective one of said plurality of openings.

* * * * *